United States Patent [19]

Bond

[11] 3,872,042

[45] Mar. 18, 1975

[54] PLASTIC LENSES AND METHOD OF MAKING SAME

[75] Inventor: Herbert M. Bond, Stillwater, Minn.

[73] Assignee: Buckbee-Mears Company, St. Paul, Minn.

[22] Filed: Aug. 28, 1973

[21] Appl. No.: 392,268

Related U.S. Application Data

[63] Continuation-in-part of Ser. No. 222,464, Feb. 1, 1972, abandoned.

[52] U.S. Cl. 260/23 AR, 260/30.6 R, 260/45.75 N, 260/45.8 NT, 260/45.85, 260/45.9 R, 260/45.95, 260/77.5 UA, 260/86.1 R, 264/1, 351/159
[51] Int. Cl. ........................ C08f 15/02, C08f 15/16
[58] Field of Search .. 260/86.1 R, 77.5 UA, 23 AR, 260/30.6 R

[56] References Cited

UNITED STATES PATENTS

| | | | |
|---|---|---|---|
| 2,445,535 | 7/1948 | Parsons et al. | 260/77.5 UA |
| 2,445,536 | 7/1948 | Parsons et al. | 260/77.5 UA |
| 2,542,386 | 2/1951 | Beattie | 264/1 |
| 2,701,245 | 2/1955 | Lynn | 260/77.5 UA |
| 2,774,697 | 12/1956 | Koblitz | 260/77.5 UA |
| 2,964,501 | 12/1960 | Sarofeen | 260/77.5 UA |
| 3,228,915 | 1/1966 | Sauer et al. | 260/77.5 UA |
| 3,297,422 | 1/1967 | Emerson et al. | 264/1 |

Primary Examiner—Harry Wong, Jr.
Attorney, Agent, or Firm—Jacobson and Johnson

[57] ABSTRACT

A copolymer plastic lens having greater light transmission, greater hardness and scratch resistance equal to the monomers used in prior art plastic lenses is obtained by the copolymerization of diethylene glycol bis (allyl carbonate) and methyl methacrylate.

4 Claims, 2 Drawing Figures

PLASTIC LENSES AND METHOD OF MAKING SAME

CROSS REFERENCE TO RELATED APPLICATIONS

This application is a continuation-in-part of my application Ser. No. 222,464, titled "Improvements in Plastic Lenses," filed Feb. 1, 1972 now abandoned.

BACKGROUND OF THE INVENTION

This invention relates generally to a cross-linkable copolymer that is polymerized and solidified by heat curing and, more specifically, to a copolymer suitable for use as lenses in eye glasses.

DESCRIPTION OF THE PRIOR ART.

Plastic lenses are old in the art and conventionally have been made from monomers such as diethylene glycol bis (allyl carbonate) which is known commercially in its monomeric form as allyl diglycol carbonate and in its monomeric or polymerized form as CR–39. It therefore should be understood that the use of any of these terms are commonly accepted identifying the same monomer by those in the art.

Because of the good clearness, high strength and high impact resistance of CR–39, it is suitable for use in plastic lenses for eye glasses. The CR–39 is not only suitable for lenses for eye glasses but is widely preferred and virtually exclusively used because of its high resistance to discolorization and its resistance to warping or distortion. A more complete description of this type of monomer and the manufacture of this type of plastic lenses can be found in the prior art Beattle U.S. Pat. No. 2,542,386. Still another material used for lenses for eye glasses is described in the prior art Emerson et al. U.S. Pat. No. 3,297,422 which suggests the use of methyl methacrylate monomers.

The present invention relates to improvements in plastic lenses by the discovery that a specific ratio of copolymers of allyl diglycol carbonate and an unsaturated ester of methacrylic acid produce copolymerized lenses which have substantially improved characteristics over the prior art monomer lenses.

In my prior referenced patent application, it was pointed out that copolymers of allyl diglycol carbonate and an unsaturated ester of methacrylic acid produce lenses having substantially improved characteristics. However, further tests and evaluation have led me to the conclusion that only the copolymer of diethylene glycol bis (allyl carbonate) and methyl methacrylate produce a lens having superior optical characteristics. Furthermore, the ratio of two polymers which produce an improved lens was determined by previous tests to have a range of approximately 10 to 50 parts by weight of methyl methacrylate with 28 parts by weight of methyl methacrylate being an optimum condition. While the above range has been found to produce lenses having optical quality, the composition of the methyl methacrylate which produces the best overall lenses have been found to be about 12 parts by weight of methyl methacrylate and 88 parts by weight diethylene glycol bis (allyl carbonate). The basis for this ratio of the two monomers has become evident only after discovery that when the two monomers are copolymerized certain reactions take place which destroy the copolymers' usefulness as a lens. That is, while copolymer can be made rather easily, only a certain copolymer in which the amounts of the monomers, the amount of catalyst and the amount of lubricant are within specified ranges produce a lens suitable for use in eyeglasses.

Typically, the lenses are cast in blanks which are approximately one-fourth inch thick and having a diameter of about 2½ inches with one surface convex and the other surface concave. This particular shape is required so that the lens blank can be ground to the proper prescription. The casting of this shape lens with monomers such as CR–39 is shown and described in the prior art Beattle Pat. No. 2,542,386.

SUMMARY OF THE INVENTION

Briefly, the invention comprises the discovery that the copolymerization of allyl diglycol carbonate with 10 to 50 parts of methyl methacrylate produces vastly improved physical characteristics in a lens material.

In another feature, the invention comprises the discovery that a copolymerization mixture wherein with a weight of 87 to 89 parts of allyl diglycol carbonate to 11 to 13 parts of methyl methacrylate produces a lens having vastly improved optical properties.

In another feature, the invention comprises the discovery that a copolymer mixture containing a catalyst ranging from about 1.0 to about 1.5% by weight of the mixture produces an improved lens.

In another feature, the invention comprises the discovery that a copolymer mixture containing benzoyl peroxide of about 1.25% by weight produces an improved lens.

In another feature, the invention comprises the discovery of improvements in a curing cycle for a copolymer mixture for plastic lenses.

In another feature, the invention comprises the discovery that a copolymer mixture wherein the weight ratio of allyl diglycol carbonate to methyl methacrylate is about 88 to 12.

DESCRIPTION OF THE PREFERRED EMBODIMENT

Figure 1:
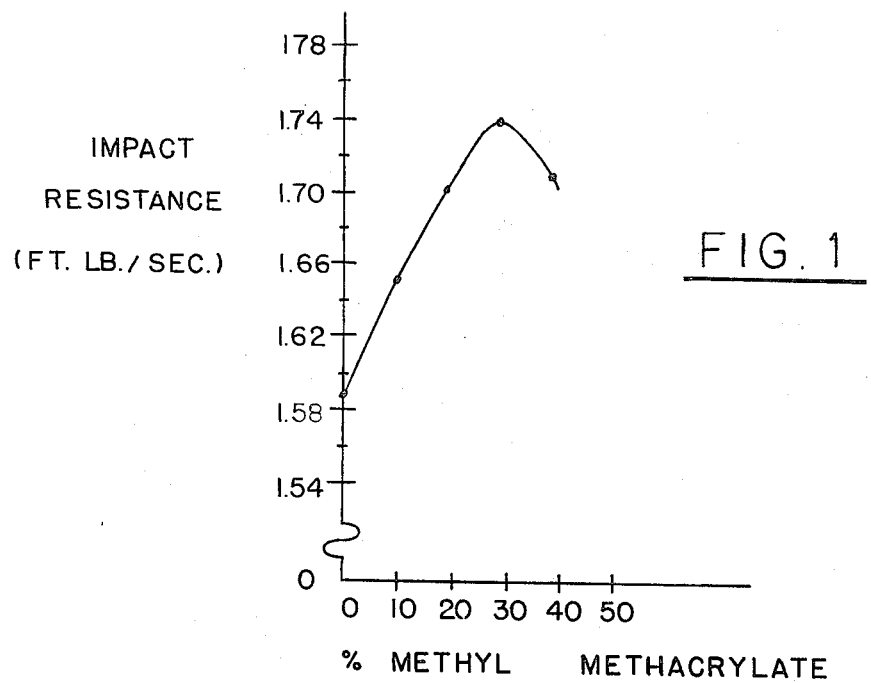
FIG. 1 shows the variation in impact resistance of the copolymer of this invention with increasing amounts of a methyl methacrylate.
Figure 2:
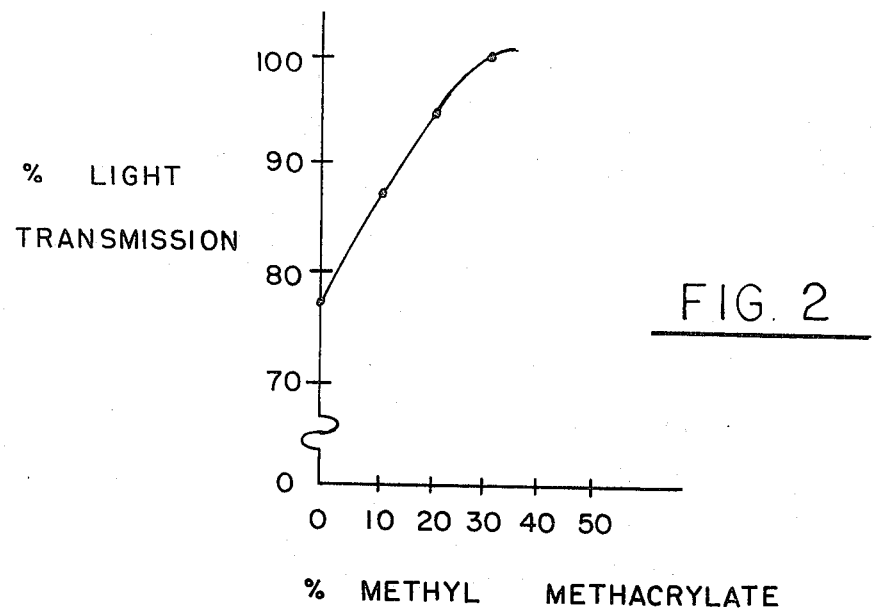
FIG. 2 shows the variation in light transmission of the copolymer of this invention with increasing amounts of methyl methacrylate.

In order to demonstrate the improved properties of my lens, reference may be had to FIGS. 1 and 2. In all the figures, the percentage of the methyl methacrylate is expressed as a percentage of the total methyl methacrylate and the allyl diglycol carbonate in the mixture. Thus, at zero percent methacrylate, the mixture contains only allyl diglycol carbonate. Thus, the weight percentage of the methyl methactylate as a function of the total mixture including catalyst and lubricants is somewhat less. It will be recalled that the allyl diglycol carbonate is the preferred and most widely used monomer resin for plastic lenses. Thus, the improvements in my invention will be apparent from the figures which show the greater light transmission ability and the higher impact resistance of my copolymer.

Referring to FIG. 1, the percentage of the methacrylate ester is plotted as a function of the impact resistance in foot pounds per second. Curve $A_1$ indicates that results using methyl methacrylate. The solid dots indicate the test results from the cast polymer, thus FIG. 1 shows the parts of methyl methacrylate to allyl diglycol carbonate of 0, 10, 20, 30 and 35%. The greatest or peak improvement to the impact resistance is with about 28% methyl methacrylate. Tests have shown the impact resistance is markedly superior with the methyl methacrylate ranging from approximately 20 to 40% but still is a decided improvement in the impact resistance in the range of 10 to 50% methyl methacrylate.

FIG. 2 shows the light transmission qualities as a function of the percentage of methyl methacrylate ester the allyl diglycol carbonate with 0% indicating the CR-39 which is commonly used in optical lenses. The curve shows the improvement in light transmission with increasing amounts of methyl methacrylate with the soled dots indicating examples of the copolymers. From FIG. 2 and the examples tested, it is readily apparent that the greatest improvement in light transmission occurs with the percentage of the methyl methacrylate ranging from 20 to 40%. But there still is a decided improvement when the percentage of methyl methacrylate ranges from 10–50%. It should be pointed out that the 0% methyl methacrylate corresponds to 100% diethylene glycol bis (allyl carbonate) or the most widely used material used for plastic lenses.

From FIGS. 1 and 2, it is apparent that the optimum condition for a plastic lens is about 28% methyl methacrylate. However, other factors which are not readily measurable have demonstrated that if the methyl methacrylate is about 11 to 13% by weight and the allyl diglycol carbonate is about 89 to 87% by weight, I obtain a lens of optical quality. This is somewhat opposite to the suggested teaching of the impact resistance and the light transmission characteristic curve shown in FIGS. 1 and 2. The basis for the above percentage being suitable for plastic lens is based primarily on visual inspection and interpretation of abrasion tests. That is, there are various types of abrasion resistance tests that can be performed on the plastic lens, however, none of them are very well suited for measuring the scratch or abrasion resistance of a lens under actual use. It has been found that one of the most simple tests, namely, lightly rubbing a pencil eraser over the surface of the lens a predetermined number of times produces the best indication of the scratch resistance of a lens in actual use. While no absolute measurements of the abrasion resistance are obtained, one can make a fairly accurate visual comparison between different lenses. It is this analysis that has led to the determination that a lens having about 11% to 13% methyl methacrylate and about 89 to 87% by weight of diethylene glycol bis (allyl carbonate) is suitable copolymer for use in eye glasses.

In order to more fully describe the process, the following examples are included herewith.

EXAMPLE 1

In order to manufacture a lens suitable for use in an eye glass, one prepares and mixes a solution of 12 parts by weight of methyl methacrylate, 1.25% by weight of benzoyl peroxide and 0.15% by weight of a U.V. absorber such a pmethoxybenzylidene malonic acid dimethyl ester. After the solution has been mixed the solution is dried by placing anhydrous sodium sulfate into the solution. Typically, a minimum of 50 grams of anhydrous sodium sulfate per 500 ml of solution is sufficient to remove the water in the solution. Next, one suction filters the solution through filter paper to remove the sodium sulfate. Next, 10 parts per million (by weight) of a lubricant such as Ortholeum 162 are stirred into the solution. At this point 88 parts by weight of diethylene glycol bis (allyl carbonate) are stirred in to the solution. The solution and the container are then placed in a vacuum chamber where the air is removed. This serves to remove the air bubbles in the solution thus eliminating the possibility of the plastic lens having internal air bubbles. Next, the evacuated container is pressurized with nitrogen at about 15 psi. After pressurizing the container with nitrogen the solution is then forced under pressure into the molds. Once the solution is in the molds the mold is placed in an oven at 65° C. for a minimum of about 3 hours followed by raising the temperature from 65°–75° C. in a minimum of about 4 hours which is followed by raising the temperature from 75° C to 100° C. in a minimum of about 10 hours, whereupon the molds are removed from the oven and allowed to cool at room temperature.

EXAMPLE 2

Further tests were conducted in which the curing cycle procedure and the composition of Example 1 were held constant with the exception of the ratio of allyl diglycol carboante to methyl methacrylate was varied in small increments between 90–10 to 85–15. It was found that at 90% diethylene glycol bis (allyl carbonate) and 10% methyl methacrylate, 5 of 6 samples fractured in the mold. Thus, the mixture of 90% diethylene glycol bis (allyl carbonate) and 10% methyl methacrylate were not suitable for use as eye glasses because of the extremely high failure rate during the casting process.

With 85% diethylene glycol bis (allyl carbonate) and 15% methyl methacrylate, it was found that the abrasive resistance of the copolymer was not at the desired level for eye glasses. From the tests conducted it was determined that the amount of diethylene glycol bis (allyl carbonate) varied from 89 to 87% and the methyl methacrylate varied from 11 to 13%.

In order to obtain a clean release of the lens from the mold, a lubricant is added to the mixture. Typical well known lubricants for use in such an application are the mono alkyl phosphates and the dialkyl phosphates or the mixtures thereof which are sold under the tradename Ortholeum 162. Another suitable lubricant is stearic acid $(CH_3(CH_2)_{16}CO_2H)$. However, the lubricant is not necessary to the invention when used for eye glasses but merely aids in stripping the lens from the mold. In fact, impurities in the mixture such as dirt or dust in the solution can also act as a lubricant to assist in release of the lens from the mold, however, these types of lubricants are generally not desirable because of the residue that remains in the lens.

Further tests were also conducted in which the lubricant was varied from 0 parts per million to 25 parts per million. With no or less than 6 parts per million of lubricant there was a tendency of the polymerized lens to adhere to the mold causing difficulty in removing the mold from the copolymerized lens. However, the lens itself was still of optical quality if the mold was carefully stripped from the lens. While it has been found that no particular lubricant produces better release from the mold, it has been found that using a lubricant in excess of 20 parts per million causes pre-release of the lens from the mold which renders the copolymerized lens unsuitable for optical use.

Generally, to manufacture my improved lenses the polymerization mixture is prepared by mixing the allyl diglycol carbonate monomer with the methacrylate ester and a catalyzer such as benzoyl peroxide, acetyl peroxide or isopropyl percarbonate. However, the benzoyl peroxide catalyst is preferred because it produces a substantially harder lens when used with the preferred ratio of the two monomers. More specifically, a suitable range of benzoyl peroxide is about 1.0 to 1.5% by weight with 1.25% by weight of the total copolymer mixture being optimum. While I have described my preferred amount of catalyst, it should be understood that more or less amounts of catalyst will work but that the copolymer does not consistently meet the characteristics required for clear, hard, plastic lenses if the amount of catalyst is increased or decreased beyond the preferred ranges.

Generally, all plastics are damaged in one way or another by degradation due to the ultra violet portion of the light radiation from the sun. However, my copolymer mixture is suitable for use in eye glasses without any UV absorbers but in the event further long term protection against degradation is desired, UV absorbers are available for mixing with the plastic. Typically, the UV absorbers are added in small concentration of less than one-half percent. Examples of some well known compounds used as UV absorbers are benzophenones, benzotriazoles, substituted acrylonitriles and phenol-nickel complexes. In the present invention it is preferred to use p-methoxybenzylidene malonic acid dimethyl ester as a UV absorber.

A more complete description of suitable UV absorbers for the copolymer lens can be found in the assignee's copending application, U.S. Ser. No. 296,194 titled "Ultraviolet Absorber for Plastic Lens Made From Copolymers of Diethylene Glycol Bis (Allyl Carbonate) and Methyl Methacrylate," filed Oct. 10, 1972, and now abandoned.

EXAMPLE 3

Further tests were conducted in accordance with the procedure of Example 1 in which the only components of the mixture were diethylene glycol bis (allyl carbonate) $O[CH_2CH_2OCOO(C_3H_5)]_2$, methyl methacrylate $CH_2{:}\ C(CH_3)COOCH_3$ and benzoyl peroxide $(C_6H_5CO)_2O_2$. In these tests the amounts diethylene glycol bis (allyl carbonate) were varied from 89 to 87%, and the methyl methacrylate was varied from 11 to 13% with the catalyst benzoyl peroxide being varied from 1.0 to 1.5% by weight of the mixture of methyl methacrylate and diethylene glycol bis (allyl carbonate). The lenses produced were of the same optical quality as those with either the lubricant or the lubricant and the UV absorber, however, it was more difficult in some cases to strip the cast lens from the mold when there was no lubricant present.

I claim:

1. The process of making a copolymerized lens having a convex surface and a concave surface with a monomer mixture of methyl methacrylate and diethylene glycol bis (allyl carbonate) which comprises mixing together in an evacuable container methyl methacrylate and diethylene glycol bis (allyl carbonate) with the monomer methyl methacrylate ranging from 11 to 13% by weight of the monomer mixture and the monomer diethylene glycol bis (allyl carbonate) ranging from 89 to 87% by weight of the monomer mixture, adding to the monomer mixture a catalyst of benzoyl peroxide ranging from 1 to 1.5% by weight of the monomer mixture of methyl methacrylate and diethylene glycol bis (allyl carbonate), drying the mixture to remove any water therein, evacuating the air from the evacuable container containing the mixture, followed by pressurizing the evacuable container with nitrogen gas to prevent formation of bubbles in the lens during the curing cycle, forcing the mixture into a mold followed by copolymerizing the mixture by curing the mixture in an oven at about 65° C. for a minimum of about three hours followed by raising the temperature from about 65° to about 75° C. in a minimum of about 4 hours, followed by raising the temperature from about 75° C. to about 100° C. in a minimum of about 10 hours and then stripping the copolymerized lens from the mold.

2. The process of claim 1 wherein the monomer mixture of methyl methacrylate and diethylene glycol bis (allyl carbonate) includes 12% methyl methacrylate and 88% diethylene glycol bis (allyl carbonate).

3. The process of claim 2 wherein the mixture is dried with anhydrous sodium sulfate.

4. The process of claim 3 wherein a lubricant is used in the quantities of less than 20 parts per million with the lubricant being selected from the group consisting of mono alkyl phosphates, dialkyl phosphates and stearic acid.

* * * * *